United States Patent [19]

Dench et al.

[11] 4,124,753

[45] Nov. 7, 1978

[54] PROCESS FOR THE PREPARATION OF ETHYLENE POLYMER TELOMER WAXES EMPLOYING NON-TOXIC 2-T-BUTYLAZO-2-CYANOBUTANE AT ABOUT 140° C GIVING HIGH PRODUCTION RATES AND LOWER REACTOR FOULING

[75] Inventors: John E. Dench, Randolph; Manfred K. Seven, Long Valley, both of N.J.

[73] Assignee: Allied Chemical Corporation, Morris Township, Morris County, N.J.

[21] Appl. No.: 859,781

[22] Filed: Dec. 12, 1977

Related U.S. Application Data

[63] Continuation-in-part of Ser. No. 625,300, Oct. 23, 1975, abandoned.

[51] Int. Cl.$^2$ .......................... C08F 4/04; C07C 69/66
[52] U.S. Cl. ................................ 526/208; 260/544 Y; 260/561 N; 260/593 R; 260/677 R; 526/212; 526/218; 526/352

[58] Field of Search ............... 526/218, 352, 212, 208; 260/484 R, 537 N, 677 R, 642, 593 R, 561 N, 544 Y

[56] References Cited

U.S. PATENT DOCUMENTS

| 3,888,911 | 6/1975 | Dench et al. | 260/484 R |
| 3,931,143 | 1/1976 | MacLeay | 526/218 |

OTHER PUBLICATIONS

Nakajima "Advances in Chem. Series" #125 ACS Wash. D. C., 1973, Eryin Editor, pp. 98–107.

*Primary Examiner*—Herbert J. Lilling
*Attorney, Agent, or Firm*—Jay P. Friedenson

[57] ABSTRACT

In the production of ethylene polymer and copolymer telomer waxes by vapor phase polymerization at elevated temperatures and pressures in the presence of a free radical initiator, improved production rates of more linear wax products with reduced reactor fouling are obtained by carrying out the reaction at about 140° C and utilizing 2-t-butylazo-2-cyanobutane as an initiator.

16 Claims, No Drawings

4,124,753

PROCESS FOR THE PREPARATION OF ETHYLENE POLYMER TELOMER WAXES EMPLOYING NON-TOXIC 2-T-BUTYLAZO-2-CYANOBUTANE AT ABOUT 140° C GIVING HIGH PRODUCTION RATES AND LOWER REACTOR FOULING

This application is a continuation-in-part of co-pending, commonly assigned application of John Edward Dench et al. with the same title, Ser. No. 625,300, filed Oct. 23, 1975, now abandoned. This invention relates to a continuous process for preparing ethylene polymer telomer waxes. More particularly, this invention relates to the preparation of hard ethylene polymer and copolymer telomer waxes at improved rates using a specific catalyst and operating conditions.

BACKGROUND OF THE INVENTION

The production of various grades of ethylene polymer and copolymer telomer waxes in the presence of free radical initiators at elevated temperatures and pressures has been commercially practiced for some years, as described in U.S. Pat. Nos. 2,504,400, 2,683,141, and 2,712,534. The production of the hardest grades of such waxes, i.e., those having penetration hardness of less than about 3.0 (ASTM test D 1321-55T in 0.1 mm) however poses special problems and has been characterized by low production rates and high reactor fouling.

Various operating parameters affect the hardness of the resultant wax product; low temperature of polymerization are required to minimize the branching of polymer chains which decreases the crystallinity and softens the wax product. Low initiator and low telogen concentrations are required to produce the hardest grades of wax. These operating conditions have a deleterious effect on the production rate of these waxes. For example, the lower the initiator concentrations, the lower the production rate. Conversely, increasing the initiator concentrations will increase the production rate but produce a softer wax product. Increased initiator concentration also leads to increased reactor fouling. Fouling of the reactor, that is, deposition of polymer gels and high molecular weight polyethylene onto the walls of the reactor is a very serious problem in producing ethylene telomer waxes. Beside the obvious result of decreasing the volume of the reactor leading to decreased production rates and increasing "down time" of the reactor for cleaning, undue fouling also leads to decreased efficiency of reactor cooling. The consequent erratic changes in temperature which may result increase the dangers of a runaway reaction and explosion.

Another disadvantage to the formation of gels is that they have a deleterious effect on product emulsifiability by reducing emulsion clarity and producing grainy films. This demonstrates that optimum conditions for the production of hard waxes results in lowering the production rate.

In U.S. Pat. No. 3,888,911 there is described a continuous process for producing wax telomers of ethylene at high production rates and with minimal reactor fouling, which process comprises reacting ethylene and a telogen in the vapor phase at an elevated temperature and pressure in the presence of, as free radical initiator, at least one of t-butylperacetate, t-butylperoctoate, 1-cyano-1-(t-butylazo)cyclohexane, 2-(t-butylazo)isobutyronitrile and 2-t-butylazo-2-phenylpropane, the conversion (as therein defined) being maintained at from 55 to 75%.

SUMMARY OF THE INVENTION

It is an object of the present invention to provide an improved continuous process for producing ethylene polymer or copolymer telomer waxes at increased production rates.

It is another object to provide a process for preparing hard ethylene polymer or copolymer telomer waxes at high production rates with minimal reactor fouling.

Another object of the invention is to provide a novel initiator for a process for preparing hard ethylene polymer or copolymer telomer waxes which initiator does not decompose during the reaction to form highly toxic compounds.

Further objects will become apparent from the following detailed descriptions thereof.

We have found that ethylene polymer and copolymer telomer waxes, particularly those having improved hardness can be prepared at improved production rates without a concomitant increase in reactor fouling by using a certain free radical initiator, 2-t-butylazo-2-cyanobutane, and certain operating conditions.

DETAILED DESCRIPTION OF THE INVENTION

Acccording to the process of the present invention, ethylene, telogen, the initiator of the invention and optionally a comonomer are continuously fed to a suitable reactor operating under pressure and are reacted at a temperature of about 140° C. The reactants are uniformly admixed in the vapor phase and the wax product continuously withdrawn as it is formed from the bottom of the reactor.

The ethylene, comonomer if employed, initiator and telogen are fed at approximately reactor pressure to the upper portion of a suitable reactor at a constant rate in order to maintain steady state conditions in the reactor once equilibrium is established. The reactants are in the vapor phase and the wax product, which is a liquid under the reaction conditions, falls to the bottom of the reactor. The product is removed as it is formed, thereby minimizing exposure of the product to the reaction conditions. The initiator is added to the telogen prior to their entry into the reactor. Any comonomer is also generally added to the telogen stream. Residence time of the reactants and product in the reactor is regulated by the rate of withdrawal of the product and the off gases, which also affects the conversion. The off gas includes unreacted starting materials, by-products of the reaction and the like, as well as catalyst and free radical residues. The latter can attach the polymer chains causing branching of the polymer and formation of gelled products. Thus the off gas flow rate should be maintained so as to minimize residence time of the product in the reactor, thereby minimizing fouling. The conversion should be maintained within the range 55 to 75 percent, preferably 59 to 65 percent. We define conversion as the ratio of the production rate in pounds/hour to the sum of the production rate in pounds/hour plus the amount of unreacted ethylene in the off gas stream in pounds/hour, multiplied by one hundred. Unexpectedly, according to the present process, increasing the off gas rate results in an increase rather than a decrease in the overall production rate up to a maximum, which occurs at the optimum conversion for each specific initiator.

By ethylene polymer and copolymer telomer waxes we mean waxes having viscosities of 25 to 1,500 centipoises at 140° C., molecular weights of 1,000 to 5,000 and softening points (Ring and Ball) of 70° C. to 118° C. These products have very low viscosities such that melt index, a measurement generally applied to polyethylenes, is so high as to be impractical when applied to the present products.

The amount of initiator to be added will vary according to the production rate desired, but generally from 1.3 × $10^{-4}$ to 4 × $10^{-4}$ mols of initiator per mol of ethylene will give optimum results.

The telogen acts both as a chain transfer agent and terminating agent. Suitable telogens are conventional and include compounds containing carbon, hydrogen, and oxygen free of olefinic unsaturation, which have boiling points below about 200° C. at atmospheric pressure, preferably below about 150° C. Preferred telogens contain up to four carbon atoms and up to two oxygen atoms. Illustrative of suitable telogens are alcohols such as methanol, ethanol, n-propanol, isopropanol, the butanols, cyclohexanol, diacetone alcohol and the like; ethers such as dimethyl ether, diethyl either, diisopropyl ether and the like; ketones such as acetone, methyl ethyl ketone, isobutyl ketone, cyclohexanone and the like; esters such as methyl formate, propyl formate, ethyl acetate, methyl propionate, ethyl butylate, methyl malonate, triethyl orthoformate and the like; acids such as acetic acid, propionic acid or butyric acid and their corresponding anhydrides; compounds such as acetaldehyde, ethylene oxide, polyethylene oxide, dioxolane, dioxane, ethyl acetal, lactones, furanes, glycol diacetate and the like. Higher molecular weight aromatic hydrocarbon compounds can also be employed such as toluene, ethylbenzene, cumene, n-propylbenzene, amylbenzene, and the like. Isopropanol and acetone are especially preferred. The amount of telogen added can vary between about 10 to 60 percent, preferably about 12 to 28 percent, by weight of ethylene, but again, the concentration should remain substantially constant i.e., − 1 percent, once equilibrium has been established within the reactor.

In addition to the preparation of polyethylene/telomer waxes, the present process can be applied equally to the preparation of copolymers of ethylene/telomer waxes. The preparation of such waxes is described in detail in U.S. Pat. No. 3,658,741. In addition to ethylene from about 0.5 to about 49 percent by weight of the ethylene of a comonomer which can be an unsaturated acid or an acyl halide, amide or ester derivative thereof, is also fed to the reactor. Suitable unsaturated acids can be monocarboxylic acids of three to six carbon atoms or dicarboxylic acids of four to eight carbon atoms, including for example acrylic acid, methacrylic acid, crotonic acid, maleic acid, fumaric acid, and the like. Illustrative of suitable acyl halides are acrylyl chloride, crotonyl chloride and the like; of suitable amides are acrylamide, methacrylamide, isopropylacrylamide and the like; of suitable esters are methyl acrylate, methyl methacrylate, ethyl acrylate, hydroxyethyl methacrylate, dimethylaminoethyl methacrylate and the like.

The reactants are fed to the reactor under suitable pressure. In the present process pressures of about 3,000 to 11,000 can be employed. Pressures of about 4,000 to 8,000 psi are preferred for the formation of hard waxes.

The temperature of the reactor must be carefully regulated. The reaction temperature must be maintained at about 140° C. to achieve the desired combination of properties in the product and maintain the desired production rate. By "about 140° C." is intended a temperature which will achieve equivalent results to that obtained at 140° C. At 140° C. a hard wax is obtained without undue branching of the polymer chains and, significantly, the production rate achieved is higher than that achieved with the closely related prior art compound 2-(t-butylazo)isobutyronitrile disclosed in U.S. Pat. No. 3,888,911. This is a unique and surprising result since at a reaction temperature of 150° C., the reverse is true, that is to say, a higher production rate is obtained with 2-(t-butylazo)isobutyronitrile as compared with the 2-t-butylazo-2-cyanobutane initiator of this invention. The preferred temperature range for the invention process is from about 140°-145° C. Most preferably, the reaction temperature should be at least 140° C.

The preferred procedure for preparing hard ethylene polymer/telomer waxes is conventional and is generally described in U.S. Pat. No. 2,683,141. An autoclave or tank-type reactor fitted with suitable agitation means and cooling means is brought to the desired temperature with steam. The pressure in the reactor is brought up to the desired operating pressure. The injection pumps are then started to deliver the required amounts of ethylene, telogen, initiator and comonomer if desired, to the upper part of the reactor and the off gas flow is started. After an initial induction period, the wax product is removed from the reactor along with the off gas, is collected in a receiving vessel and passed through a deodorizer to storage.

The invention will be further illustrated by the following examples, but it is to be understood that the invention is not meant to be limited to the details therein. In the examples, hardness is determined according to ASTM test D 1321-55T using an NBS certified D1321 needle.

In the Examples, ethylene of at least 99 percent purity and isopropanol of at least 99.8 percent purity as telogen were employed. The following procedure was used for the start up of each run: (a) the reactor was brought to operating temperature with steam; (b) the pressure was brought up to about 3,000 psi with ethylene, and an initial injection of isopropanol was pumped in; (c) the pressure was increased with ethylene to operating pressure; (d) high pressure injection pumps were started to deliver the required amounts of isopropanol and initiator dissolved in isopropanol; (e) the reactor let-down control valve for off gas flow was opened; (f) downstream equipment including scrubbers, off gas coolers and the like were put in operation; (g) after a brief induction period wax product started to form, the deodorizer was started and sampling begun on an hourly basis; (h) steady state conditions were achieved after 2-4 hours. Each run was continued for about 50-100 hours. When the run was terminated, the reactor was cooled and opened for inspection of fouling deposits.

EXAMPLES 1 to 9

Ethylene, isopropanol and initiator selected from the 2-t-butylazo-2-cyanobutane initiator of the invention and the 2-(t-butylazo)isobutyronitrile initiator of prior art U.S. Pat. No. 3,888,911, were injected into a 4 liter cylindrical pressure reactor substantially as described in U.S. Pat. No. 2,683,141 except that the product was withdrawn as it was formed from the bottom of the reactor along with the off gas. The pressure in the reactor was maintained at 7,000 psi during the reaction. The other reaction conditions and the results are summarized in the Table:

TABLE

| Example No. | Ethylene Feed (lb./hr) | Isopropanol (% based on ethylene feed) | Initiator | Catalyst feed (cc/hr) S.G. =0.85 (20° C/20° C) | Production Rate (lb./hr.) | Visc. cps. 140° C. | Hardness (Units of 0.1mm pen.) | Conv. (%) | Temp. ° C. |
|---|---|---|---|---|---|---|---|---|---|
| 1 | 3.47 | 22 | 2-t-butylazo-2-cyanobutane | 3.30 | 2.02 | 350 | 0.2 | 58.0 | 140 |
| 2 | 3.36 | 20 | " | 2.50 | 2.01 | 335 | 0.2 | 59.8 | 140 |
| 3 | 3.21 | 21 | " | 2.45 | 2.01 | 285 | 0.2 | 62.7 | 140 |
| 4 | 3.02 | 16 | " | 2.45 | 1.97 | 410 | 0.2 | 65.3 | 140 |
| 5 | 3.85 | 17 | " | 3.00 | 2.39 | 250 | 0.2 | 62.0 | 160 |
| 6 | 3.65 | 18.5 | " | 1.95 | 2.30 | 255 | 1.0 | 63.0 | 160 |
| 7 | 4.11 | 20 | " | 2.45 | 2.56 | 235 | 0.6 | 62.2 | 160 |
| 8 | 3.09 | 19.5 | " | 1.48 | 1.94 | 260 | 0.6 | 62.8 | 160 |
| 9 | 3.22 | 21 | " | 1.50 | 2.02 | 215 | 1.5 | 62.7 | 170 |
| 10 | 3.42 | 21 | " | 3.30 | 2.22 | 290 | .2 | 65.0 | 140 |
| 11 | 3.13 | 19 | " | 2.50 | 2.01 | 310 | .2 | 64.3 | 140 |
| 12 | 3.90 | 21 | " | 3.30 | 2.46 | 310 | .5 | 63.0 | 150 |
| 13 | 3.38 | 19 | " | 2.50 | 2.11 | 270 | .5 | 62.5 | 150 |
| 14 | 3.49 | 22 | 2-(t-butylazo)-isobutyronitrile | 3.30 | 2.11 | 265 | .2 | 60.5 | 140 |
| 15 | 2.90 | 19 | " | 2.50 | 1.82 | 280 | .3 | 62.8 | 140 |
| 16 | 4.03 | 18 | " | 3.30 | 2.58 | 290 | .6 | 64.0 | 150 |
| 17 | 3.46 | 17 | " | 2.50 | 2.20 | 325 | .5 | 63.5 | 150 |

Example 1 - Product density = 0.9419 (gm/ml.); softening point = 117.9° C.

The above runs were continued for 3–5 days. Despite the very high production rates, very little reactor fouling was noted.

The runs of Examples Nos. 1–13 were conducted with the 2-t-butylazo-2-cyanobutane initiator of the invention. The runs of Examples 14–17 were conducted with the closely related 2-(t-butylazo)-isobutyronitrile initiator of the prior art. It can be seen by comparing the production rates obtained at the reaction temperature of 140° C. and 150° C. that the initiator of the invention was less active than the prior art initiator at 150° C. but more active at 140° C. than the prior art initiator under otherwise comparable conditions. (Runs with comparable catalyst feeds should be compared.) The higher activity of the 2-t-butylazo-2-cyanobutane initiator of the invention at 140° C. is surprising. This is particularly so since 2-t-butylazo-2-cyanobutane has a longer half life than 2-(t-butylazo)-isobutyronitrile. One skilled in this art would have expected less efficiency from a longer half life compound at the lower temperature.

During the reaction in the runs with the prior art initiator, tetramethyl succinonitrile, a highly toxic compound, is formed as a decomposition product. No such toxic decomposition product is formed with the 2-t-butylazo-2-cyanobutane initiator of the invention.

We claim:

1. In the process for preparing wax telomer polymers of ethylene having a penetration hardness of less than about 3 determined according to ASTM test D 1321-55T, by vapor phase reaction of a feed stream containing ethylene, a telogen and a free radical initiator, the improvement which comprises carrying out the reaction at above 140° C. and utilizing as intiator 2-t-butylazo-2-cyanobutane at conversions of between 55 to 75 percent.

2. A process according to claim 1 wherein the telogen is isopropanol.

3. A process according to claim 1 wherein the telogen is acetone.

4. A process according to claim 1 wherein the reaction is conducted under pressures of from 6,000 to 8,000 psi and $4 \times 10^{-4}$ mole of 2-t-butylazo-2-cyanobutane as initiator at conversions between 59 and 65 percent.

5. A process according to claim 1 wherein the feed stream contains ethylene and from 0.5 to 49 percent, by weight of the ethylene, methyl methacrylate, and wherein the telogen is isopropanol.

6. A process according to claim 1 wherein the reaction is carried out at pressures of 3,000 to 11,000 psi.

7. A process according to claim 1 wherein from 10 to 60 percent by weight of ethylene of the telogen is charged to the reactor.

8. A process according to claim 1 wherein from $1.3 \times 10^{-4}$ mols of initiator per mol of ethylene is charged to the reactor.

9. A process according to claim 1 wherein conversion is between 59 to 65 percent.

10. A process according to claim 4 wherein from 12 to 28 percent by weight of ethylene of the telogen is charged to the reactor.

11. In the process for preparing wax telomer polymers of ethylene having a penetration hardness of less than about 3, determined according to ASTM test D 1321-55T by vapor phase reaction of a feed stream containing ethylene, a telogen and a free radical initiator, the improvement which comprises carrying out the reaction at about 140° C. and utilizing as initiator 2-t-butylazo-2-cyanobutane.

12. A process according to claim 11 wherein said telogen is an organic compound containing carbon, hydrogen, and oxygen, is free of olefinic unsaturation, and is characterized by having a boiling point below about 200° C. at atmosphere pressure.

13. A process according to claim 11 wherein the wax telomer polymer is copolymer of ethylene and acrylic acid, the feed stream contains ethylene and acrylic acid in an amount of from about 0.5 to about 49 percent, by weight of the ethylene, and wherein the telogen is isopropanol.

14. A process according to claim 11 in which the reaction is carried out from 140°–145° C.

15. A process according to claim 1 in which the reaction is carried out from 140°–145° C.

16. A process according to claim 15 wherein the wax telomer polymer is copolymer of ethylene and methacrylic acid, the feed stream contains ethylene and methacrylic acid in an amount of from about 0.5 to 49 percent, by weight of the ethylene, and wherein the telogen is isopropanol.

* * * * *